United States Patent [19]

Richardson

[11] 3,747,677

[45] July 24, 1973

[54] PLUGGING SOLUTION PRECIPITATION TIME CONTROL BY EPOXIDE REACTION

[75] Inventor: Edwin A. Richardson, Houston, Tex.

[73] Assignee: Shell Oil Company, Houston, Tex.

[22] Filed: Oct. 26, 1971

[21] Appl. No.: 192,464

[52] U.S. Cl. .................................. 166/293, 166/270
[51] Int. Cl. ............................................ E21b 33/13
[58] Field of Search ................. 166/270, 281, 293, 166/294, 295, 300

[56] References Cited
UNITED STATES PATENTS

| | | | |
|---|---|---|---|
| 2,238,930 | 4/1941 | Chamberlain et al. | 166/300 |
| 2,995,189 | 8/1961 | Cutforth | 166/293 |
| 3,210,310 | 10/1965 | Holbert et al. | 166/295 |
| 3,516,496 | 6/1970 | Barkman, Jr. et al. | 166/281 |
| 3,614,985 | 10/1971 | Richardson | 166/300 |
| 3,669,188 | 5/1972 | Coles et al. | 166/270 |

*Primary Examiner*—Marvin A. Champion
*Assistant Examiner*—Jack E. Ebel
*Attorney*—H. W. Coryell and Harold L. Denkler

[57] ABSTRACT

The precipitation time of a precipitate-forming aqueous solution containing a polyvalent metal that precipitates as a gelatinous metal hydroxide and a reactant that raises the pH to cause the precipitation is controlled, and/or precipitation at temperatures above about 130°F is inhibited, by dissolving in the aqueous solution a reactive mixture of halide ions and an epoxide.

2 Claims, 1 Drawing Figure

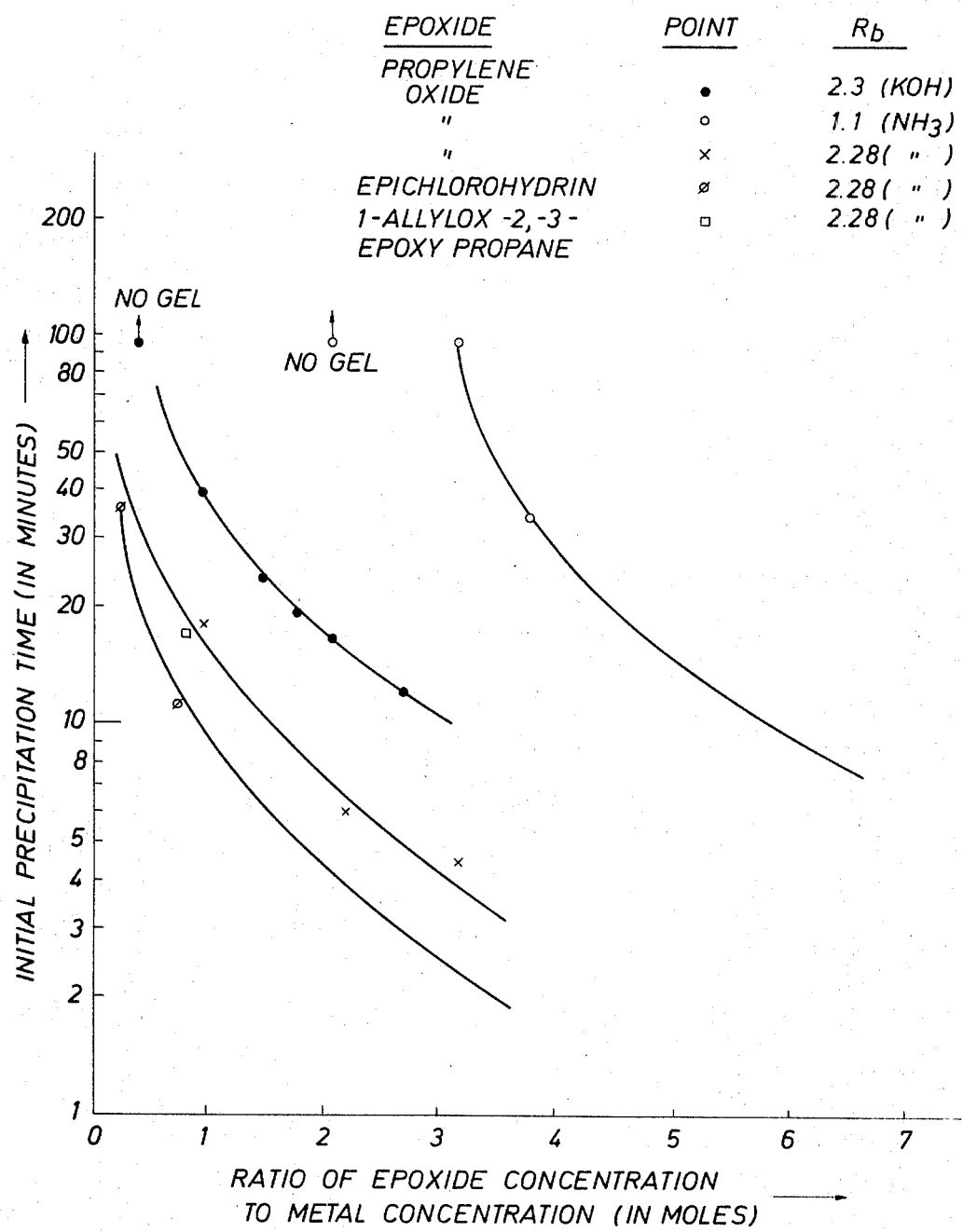

PLUGGING SOLUTION PRECIPITATION TIME CONTROL BY EPOXIDE REACTION

BACKGROUND OF THE INVENTION

This invention relates to a homogeneous solution precipitation type of gelling or plugging agent for producing a relatively immobile gelled fluid and/or precipitate for reducing the permeability of a permeable material. The present invention provides plugging solution formulations that are similar to those described in co-pending patent application, Ser. No. 23,500, filed Mar. 30, 1970, by E. A. Richardson except for the inclusion of a reactive mixture of halide ions and an epoxide.

SUMMARY OF THE INVENTION

This invention provides a precipitate-forming solution which is adapted to maintain its homogeneity and a selected degree of mobility throughout a selected combination of time and temperature and then become relatively immobile due to the precipitation of a gelatinous metal hydroxide. The present precipitate-forming solution comprises an aqueous solution of a polyvalent metal that forms a gelatinous metal hydroxide, a pH-increasing reactant and a reactive mixture of halide ions and at least one epoxide.

DESCRIPTION OF THE DRAWING

The drawing shows a plot of precipitation time with increasing concentration of epoxide.

DESCRIPTION OF THE INVENTION

The present precipitate-forming solutions are useful in numerous well treating, fluid diverting, or permeable material plugging operations. They are generally useful wherever it is desirable to flow an aqueous solution having a selected mobility into a selected location at which the mobility of the solution becomes significantly less. These solutions can be used in treating wells and/or boreholes for purposes such as: plugging portions of a subterranean reservoir from which (or into which) it is no longer desirable to produce (or inject) fluid; plugging an earth formation to shutoff an intrusion of water into a gas-drilled well borehole; improving the uniformity of the injection profile of a reservoir interval; pretreating the borehole of a well in which a casing is to be cemented (by preceding the cement with a slug of fluid that penetrates into reservoir rocks, micro fractures, and the like and subsequently gels) to supplement the sealing effect of the cement; preventing or controlling the loss of fluid that is being circulated within a well or borehole; etc.

The present invention is particularly useful for providing a selective plugging process for increasing the uniformity with which a plugging agent is distributed throughout the more permeable portions of a region of non-uniform permeability. Such a selective plugging is preferably accomplished by the following steps: (1) fluid is injected into the permeable region to form a stream flowing between a fluid source and the most permeable zone within the region; (2) the precipitate-forming solution of the present invention is inlcuded in that stream; and (3) the composition of the precipitate-forming solution is adjusted (with respect to its metal ion concentration, initial pH, proportion of incompletely dissociated polyvalent acid, the temperatures in the permeable region and at a point at which the solution is compounded, and the rate at which the solution is injected into the permeable region) so that the metal hydroxide precipitation occurs in each portion of the injected plugging solution within a selected generally short time after each portion enters the permeable region.

In such a selective plugging process, the mobility of the preci-pitate-forming solution is preferably made substantially equal to that of the remainder of the fluid that forms the flow stream between the fluid source and region being treated. The procedure is advantageous in insuring that all or most of the initial portions of the plugging solution flow into the most permeable zones within the region being treated. The most permeable zones may be the most permeable layers or the largest pores and may be located within some or all portions of the region. In such a plugging procedure, the first arriving older portions of the plugging solution are displaced by the later arriving younger portions and, as the older portions of the solution begin to gel and become less mobile, their gelation occurs within their most permeable zones. The following younger portions of the plugging solution are thus diverted and, by increasing the injection pressure, are forced into zones of lower permeability. When the younger portions begin to gel, they do so within zones that initially were less permeable than the most permeable zones; and, the plugging material is distributed substantially uniformly throughout all of the more permeable portions of the region.

The hydrolysis of urea in a dilute (<0.1M) aluminum chloride solution produces a fine precipitate of hydrated alumina. At higher aluminum concentrations, a soft alumina gel is produced. The gel is formed when the molar concentration ratio (R) of base to aluminum is about 2.4. In practice, the system R ratio is initially adjusted to the range $R_i = 2.0 - 2.3$ with NaOH or KOH and sufficient urea added to cause gel formation upon subsequent urea hydrolysis. The gel time is adjusted by the initial $R_i$ value and urea concentration. The effect of $R_i$ on the gel time is typified by the behavior at 190°F and 200°F of a 0.5M $Al^{+3}$ solution with urea/$Al^{+3}$ ratio ($R_u$) of $R_u = 2.0$. In this system, the alumina colloid is stabilized by adsorbed positively charged hydrogen ions, $H^+$. The difference between $R = 2.4$ (the gel-initiating R value) and the $R_i$ value is a measure of the excess $H^+$ ion that must be neutralized by urea hydrolysis. Where the $R_i$ is about 2.3 the gel time is about 350 minutes (almost 6 hours).

There is a limit to the gel time that can be obtained by increasing $R_i$. At $R_i$ values greater than about 2.34, gel times accelerate rapidly and practical control of the system is lost. An additional upper limit on $R_i$ results from problems in mixing high $R_i$ solutions. When $NH_4OH$ or KOH is added to aluminum chloride solutions, high local solution pH results in weak gel formation. Time is required for repeptization, cleaning and aging of the solution. The higher the $R_i$, the longer the time required for clearing.

The present precipitate-forming solutions utilize a precipitation time controlling epoxide reaction typified by one of the following reactions of ethylene oxide:

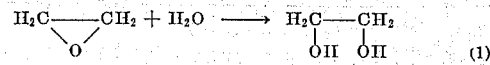

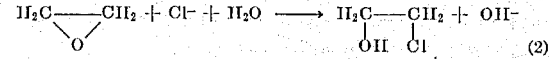

Reaction (1) is a simple hydrolysis and is the predominant epoxide reaction at temperatures above about 130°F. Reaction (2) is a hydroxyhalogenation and is the predominant epoxide reaction at temperatures of from about 70° to 130°F. Since the present precipitate-forming solutions contain both a pH-increasing reactant and a dissolved mixture of reactive halide ions and epoxide, at temperatures between about 70° and 130°F, the pH is increased by both the reaction of the pH-increasing reagent and the release of hydroxide ions by the epoxide reaction indicated by equation (2). Where the amount of pH-increasing reactant is insufficient to cause precipitation in the absence of the additional hydroxide ions released by the epoxide reaction, precipitation occurs in any portion of the precipitate-forming solution that is kept cooler than about 130°F. This provides a precipitate-forming solution having very unique reaction properties. The solution reacts to form precipitate when it is kept relatively cool but forms no precipitate when it is kept relatively hot. In addition, the present precipitate-forming solutions are relavitely rapidly reactive at relatively low temperatures and thus are adapted for effecting the above described selective plugging process in a reservoir having a temperature of less than about 130°F.

Suitable epoxides for use in the present invention include substantially any water-soluble epoxy organic compound which is adapted to be hydroxyhalogenated at a relatively low temperature and hydrolyzed at a somewhat higher temperature in an aqueous solution containing an effective amount of halide ions. Such epoxides include propylene oxide and/or its homologues or analogues such as ethylene oxide, epicholrohydrin, 1-allyloxy-2, 3-epoxy propane, 2, e-epoxy-1-proponol, cyclohexene oxide, polyethoxyepoxides such as the condensation products of ethylene oxide and an alcohol, and the like. Water soluble epoxides of from about two to five carbon atoms are preferred. The concentration of the epoxide is preferably an amount which, when combined with the other pH-increasing components of the precipitate-forming solution, is effective to cause precipitation of the solution, when the epoxide reaction is hydroxyhalogenation, as indicated by equation (2). In general a molar concentration ratio (relavite to the metal) of from about 0.1 to 10 is preferred.

Suitable halide ions for use in the present process include the chloride, bromide and iodide ions, with the chloride ions being preferred. The amount of halide ions is preferably at least an excess, stoichiometrically, relative to the amount of epoxide.

The precipitate-forming systems of the present type are substantially immune to the effects of pressure. This adapts them for uses in highly pressurized environments, e.g. for well treating uses in which the absolute pressure in the subterranean permeable intervals may be relatively high, such as several thousand pounds per square inch. Tests conducted with the present systems established that pressure has no appreciable effect and can be ignored. However, since no gas is produced in the pH-increasing reaction of an epoxide, the present systems are particularly suited for use in relatively shallow and/or other relatively low pressure reservoirs.

In the precipitate-forming solutions of the present invention, the essential ingredients comprise an aqueous liquid solution of (a) a salt of a polyvalent metal, such as $AlCl_3$, (b) a pH-increasing reactant, such as urea, and (c) a reactive mixture of halide ions and at least one epoxide, such as chloride ions and propylene oxide. The solutions can advantageously contain various additional ingredients as long as the latter do not interfere with the above described functions of the above essential ingredients. For example, when a plugging material is to be deposited in a permeable region containing fractures and/or vugs of relatively large pores, the precipitate-forming solutions can advantageously contain a suspension of solid particles, such as crushed sand grains, carbonates, walnut shells, or the like, to cause a passageway-bridging effect and/or to add additional permeability reducing solids material. Where such a permeable zone contains water-sensitive clays, the precipitate-forming solutions can advantageously contain clay-stabilizing materials, such as neutral salts, amines, amine salts, or the like although polyvalent metal salts such as aluminum chloride are, themselves, clay-stabilizing materials. Where desirable, for example, in view of a particular distribution of the thicknesses and permeabilities of various layers or pores within a permeable interval, or in view of other needs for a relatively high initial viscosity, the precipitate-forming solutions can contain thickening agents such as partially hydrolyzed polyacrylamides, carboxymethylcellulose, and the like types of water thickening materials.

The polyvalent metal salts used in the present precipitate-forming solutions can comprise substantially any such salt which is soluble in an aqueous solution of relatively low pH and is precipitated as a hydrated metal oxide from an aqueous solution of a moderately higher pH. Such salts are preferably soluble at a pH of from about 2 to 7 and precipitated at from about 7 to 10. The preferred polyvalent metal salts are salts of metals that form gelatinous metal hydroxides or hydrated metal oxides of very low water solubilites. Such metals are typified by aluminum, chromium, iron, copper, bismuth, etc. Such metals are preferably used in the form of salts having relatively high water-solubility in aqueous solutions having a pH of from about 2 to 7, such as the chlorides, nitrates, acetates, or the like.

The present precipitate-forming solutions can contain a wide variety of pH-adjusting materials. Such materials are inclusive of substantially any water-soluble compound or mixture which reacts within a water solution to produce one or more water-soluble alkaline products that increase the pH of the solution. Suitable materials include urea, water-soluble amides of carbamic acid such as ammonium carbamate, carbonic acid halides, urea, salts of cyanic acid, such as the alkali metal cyanates, cyanamide, and the like.

The concentration of the polyvalent metal salt and the pH-ad-justing reactant can be varied over relatively wide limits. Either of these components can be present in proportions ranging from about 0.1 percent by weight of the aqueous solution to an amount as high as about 30 percent or more that forms a substantially saturated solution. In precipitate-forming solutions containing a relatively low concentration of polyvalent metal salts, the precipitates tend to be discrete particles of gelatinous metal hydroxides, and solutions containing higher concentrations tend to become gels.

Where the pH of an aqueous solution of a particular polyvalent metal salt is relatively low, it can be increased by adding an alkaline material, for example, the pH of an aqueous solution of aluminum chloride is preferably increased (by the addition of a hydroxide, such as an ammonium, sodium and/or potassium hydroxide) to a value of about 4. Potassium cyanate can advantageously be added in order to uitilize its relatively rapid hydrolysis at relatively low temperatures to raise the pH of the solution to one from which gelation can readily be induced within a selected time.

Gel times can also be varied by adjusting the urea concentration. The gel time decreases substantially logarithmically with increases in $R_u$.

A simple titration procedure was developed for determining the aluminum concentration and $R_i$ values of plugging sysyems such as the present system. Since the alumina colloid is stabilized at low pH by adsorbed $H^+$, gelation may be achieved by the hydrolysis of urea, producing ammonia, which increases the pH. When the molar ratio (R) of $NH_3$ to $Al^{+3}$ is about 2.4, the alumina colloid is destabilized and a gel is formed. Owing to the relatively slow hydrolysis of urea, excessively long gel times would result if urea were the only source of $H^+$ neutralizing base. Gel times are de-creased by adding base ($NH_4OH$ or $KOH$) directly to produce an $R_i$ value (initial R value) slightly less than that required for gelation, $R_i = 2.2 - 2.3$. This initial R value can be determined by titrating the excess acid remaining in the system with a standard sodium hydroxide solution. Similarly, prior to the addition of base, i.e., $R_i = 0$, the concentration of the aluminum can be determined by titrating the total amount of acid in the system.

In these analyses, the excess acid is titrated to the bromothymol blue indicator end point (yellow-blue) with 1.0 N NaOH. The $Al^{+3}$ concentration and $R_i$ values are then calculated using the appropriate empirically determined correction factors as follows:

$Al^{+3}$ concentration (moles/liter) = $(V_t M_t / V_x C_1)$ $$R_i = C_2 V_x M_s - V_t M_t$$

where
- $V_s$ = volume $Al^{+3}$ solution
- $M_s$ = $Al^{+3}$ concentration, moles/liter
- $V_t$ = volume NaOH liter
- $M_t$ = concentration of NaOH titer, moles/liter
- $C_1$ = 2.8 (empirically determined)
- $C_2$ = 2.7 (empirically determined)

The correction factors, $C_1$ and $C_2$, will vary with the indicator used. Those shown are for bromothymol blue. Although other indicators could be used with pH changes in the range pH = 5 - 9, bromothymol blue was selected as it had the easiest detected end point. The test procedures are as follows:

Aluminum concentration. (This titration must be done before any base is added to the system.)
a. Into a 100 ml beaker,
  1. 5 ml $Al^{+3}$ solution
  2. 35 ml distilled water
  3. 1 ml bromothymol blue indicator
b. Titrate with 1. ON NaOH to light blue-green end point. When the solution gels part way through the titration, stop addition of NaOH until gel breaks then continue titration.
c. $Al^{+3}$ concentration (moles/liter) = (ml 1.ON NaOH)/14

$R_i$ Value Titration
a. Into a 100 ml beaker, add:
  1. 20 ml of test solution
  2. 20 ml of distilled water
  3. 1 ml of bromothymol blue indicator
b. Titrate with 1.0 NaOH to light blue-green end point. Stop titration when gel forms until gel breaks.
c. $R_i = [54 (M_s) - (ml\ 1.ON\ NaOH)]/20\ M_s$
where $M_s$ = concentration of $Al^{+3}$ (moles/liter).

Tests of the variations of initial precipitation time with increase in temperature have indicated that the reaction rate of a solution containing a relatively low molecular weight epoxide such as propylene oxide is substantially doubled with each 15° to 20°F increase in temperature.

The effect of epoxide type and concentration on initial precipitation time was tested with respect to aqueous solutions which were 0.47 molar in aluminum ion 1.41 molar in chloride and contain the indicated ratios ($R_b$) of moles of base per mole of aluminum ion. Each of the solutions were heated to clear them after the addition of the base and were maintained at a temperature of about 130°F. The results of the test are indicated by the drawing, which shows a semi-logarithmic plot of initial precipitation time in minutes, with increasing concentration of the specified epoxides, in ratio of molar concentration of epoxide to aluminum ion. The types and concentrations of the components are point treated on the drawing.

The following is indicative of a capability of the present solutions to form precipitates in a relatively cool environment while forming no precipitates in hotter environments:

| A Composition of Solution | B Gel Tests |
|---|---|
| 1. $R_b = 1.1\ NH_3$ | 70°F — Gelled in 8 hours |
| 2. $R_{po} = 2.2$ | 130°F — No gel developed |
| 3. $Al^{+3} = 0.5$ molar | 160°F — No gel developed |

As indicated above and in the drawing, at the higher temperatures, the epoxide hydration reaction indicated by equation (1) predominates and prevents gelling and at lower temperatures the epoxide hydroxyhalogenation reaction of equation (2) causes the precipitation.

What is claimed is:

1. A process of distributing a plugging agent substantially uniformly through the more permeable portions of impermeable region having a non-uniform permeability comprising:
  injecting fluid into the permeable regions so that a flow stream is established between a fluid source and the most permeable zone within the region;
  including in the fluid being injected into the permeable region an aqueous solution that contains a dissolved salt of a polyvalent metal that forms a gelatinous metal hydroxide, a dissolved pH-increasing reactant and a dissolved reactive mixture of halide ions and at least one epoxide; and
  correlating the composition of the aqueous solution with respect to the temperature in the permeable region and the location at which the solution is compounded with the rate of fluid injection so that the metal hydroxide precipitation occurs within each increment of the injected solution within a relatively short time after it enters the permeable region.

2. A process for reducing the permeability of the most permeable portions of a permeable subterranean region having a non-uniform permeability and a temperature above about 130°F comprising:
injecting relatively cool fluid into said region to flow preferentially into the most permeable portions and reduce their temperature to less than about 130°F; and subsequently
injecting into said permeable region an aqueous solution that contains a dissolved salt of a polyvalent metal that forms a gelatinous metal hydroxide, a dissolved pH-increasing reactant and a dissolved reactive mixture of halide ions and at least one epoxide.

* * * * *